United States Patent
Hull et al.

(10) Patent No.: US 9,511,513 B2
(45) Date of Patent: Dec. 6, 2016

(54) METHOD AND APPARATUS FOR MAKING FIBER REINFORCED COMPOSITE TUBES

(71) Applicant: The Boeing Company, Chicago, IL (US)

(72) Inventors: John Ralph Hull, Sammamish, WA (US); Mark Alan Negley, Bellevue, WA (US); Michael Strasik, Sammamish, WA (US); John A. Mittleider, Kent, WA (US)

(73) Assignee: THE BOEING COMPANY, Chicago, IL (US)

(*) Notice: Subject to any disclaimer, the term of this patent is extended or adjusted under 35 U.S.C. 154(b) by 0 days.

(21) Appl. No.: 14/604,682

(22) Filed: Jan. 24, 2015

(65) Prior Publication Data
US 2015/0136327 A1 May 21, 2015

Related U.S. Application Data

(62) Division of application No. 12/886,860, filed on Sep. 21, 2010, now Pat. No. 8,992,711.

(51) Int. Cl.
| | |
|---|---|
| *B29C 70/14* | (2006.01) |
| *B29C 33/00* | (2006.01) |
| *B29C 70/12* | (2006.01) |
| *B29C 70/32* | (2006.01) |
| *B29C 33/02* | (2006.01) |
| *B29C 33/38* | (2006.01) |
| *B29C 70/02* | (2006.01) |
| *B29D 23/00* | (2006.01) |
| *B29L 23/00* | (2006.01) |
| *B29L 31/08* | (2006.01) |

(Continued)

(52) U.S. Cl.
CPC ......... *B29C 33/0061* (2013.01); *B29C 33/026* (2013.01); *B29C 33/3807* (2013.01); *B29C 70/021* (2013.01); *B29C 70/12* (2013.01); *B29C 70/326* (2013.01); *B29D 23/00* (2013.01); *B29K 2105/12* (2013.01); *B29L 2023/22* (2013.01); *B29L 2031/08* (2013.01); *B29L 2031/7172* (2013.01); *B29L 2031/7498* (2013.01)

(58) Field of Classification Search
CPC ................................. B29C 70/12; B29C 70/14
See application file for complete search history.

(56) References Cited

U.S. PATENT DOCUMENTS

| | | | |
|---|---|---|---|
| 3,052,927 A | 9/1962 | Hoppe et al. | |
| 3,150,219 A | 9/1964 | Schmidt | |
| 3,309,762 A | 3/1967 | Harper | |

(Continued)

FOREIGN PATENT DOCUMENTS

| | | |
|---|---|---|
| EP | 0022165 A1 | 1/1981 |
| EP | 2431161 A1 | 3/2012 |

(Continued)

OTHER PUBLICATIONS

Extended European Search Report, dated Dec. 2, 2011, regarding Application No. EP11181859.7, 7 pages.

(Continued)

*Primary Examiner* — Jeff Aftergut
(74) *Attorney, Agent, or Firm* — Yee & Associates, P.C.

(57) ABSTRACT

A composite tube is made by applying a mixture of individual reinforcing fibers and a resin onto the interior cylindrical wall of the spinning mandrel.

12 Claims, 7 Drawing Sheets

(51) Int. Cl.
*B29L 31/00* (2006.01)
*B29K 105/12* (2006.01)

(56) References Cited

U.S. PATENT DOCUMENTS

| | | | |
|---|---|---|---|
| 3,412,431 A * | 11/1968 | Lemelson | B29C 41/08 425/116 |
| 3,507,011 A | 4/1970 | Pellicer et al. | |
| 3,555,614 A | 1/1971 | Wiltshire | |
| 3,692,601 A * | 9/1972 | Goldsworthy | B29C 41/20 156/169 |
| 3,973,596 A * | 8/1976 | Walker | B29C 70/326 138/132 |
| 4,043,721 A | 8/1977 | Lemelson | |
| 4,097,572 A * | 6/1978 | Walker | B29C 33/68 264/310 |
| 4,980,112 A | 12/1990 | Masters | |
| 5,819,614 A * | 10/1998 | Jander | B29B 11/16 156/167 |
| 2008/0047657 A1 | 2/2008 | Jander | |
| 2010/0135819 A1 | 6/2010 | Hibbard | |
| 2012/0067514 A1 | 3/2012 | Hull et al. | |

FOREIGN PATENT DOCUMENTS

| | | |
|---|---|---|
| FR | 2736860 A1 | 1/1997 |
| JP | 4835936 B1 | 10/1973 |
| JP | 57157730 A | 9/1982 |

OTHER PUBLICATIONS

Christensen, Mechanics of Composite Materials, Dover Publishing, New York, 2005, pp. 99.
Cox, "The elasticity and strength of paper and other fibrous materials," British Journal of Applied Physics, Mar. 1952, vol. 3, No. 3, pp. 72-79.
Huang et al., "Interfacial micromechanics in thermoplastic and thermosetting maxtrix carbon fibre composites," Composites Part A: Applied Science and Manufacturing, 1996, vol. 27, Issue 10, pp. 973-980.
Thomason et al., "Interfacial strength in thermoplastic composites—at last an industry friendly measurement method?," Composites Part A: Applied Science and Manufacturing, 2002, vol. 33, Issue 10, pp. 1283-1288.
Thomason et al., "Influence of fibre length and concentration on the properties of glass fibre-reinforced polypropylene: Strength and strain at failure," Composites Part A: Applied Science and Manufacturing, 1996, vol. 27, Issue 11, pp. 1075-1084.
Thomason et al., "Influence of fibre length and concentration on the properties of glass fibre-reinforced polypropylene: Tensile and flexural modulus," Composites Part A: Applied Science and Manufacturing, 1996, vol. 27, Issue 6, pp. 477-484.
Office Action, dated Dec. 6, 2012, regarding U.S. Appl. No. 12/886,860, 19 pages.
Final Office Action, dated Apr. 5, 2013, regarding U.S. Appl. No. 12/886,860, 14 pages.
Office Action, dated May 7, 2014, regarding U.S. Appl. No. 12/886,860, 14 pages.

* cited by examiner

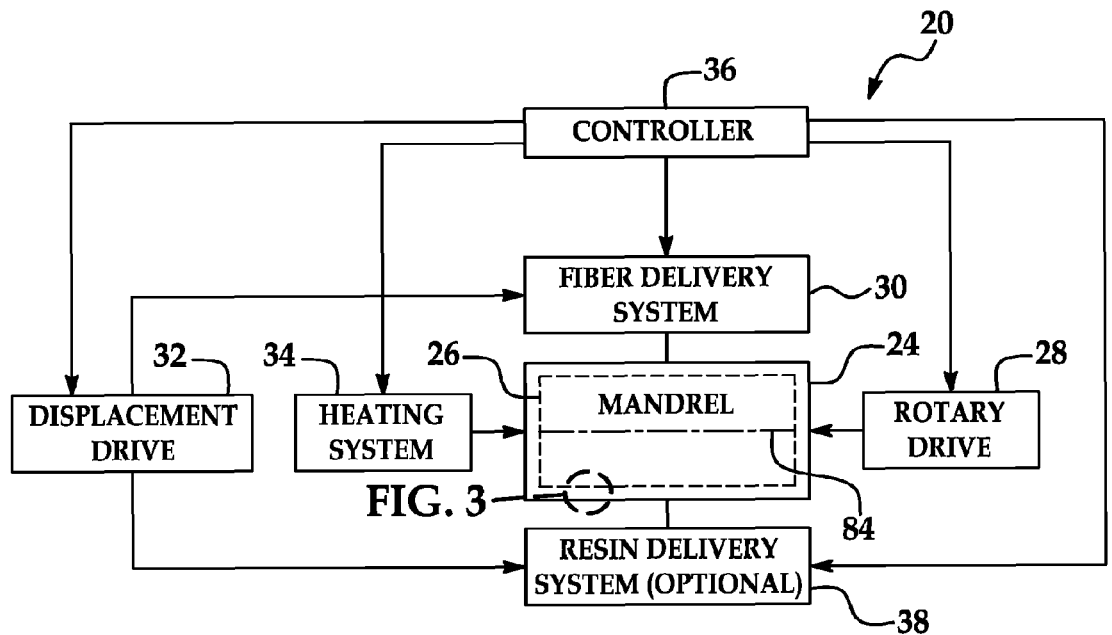
FIG. 1
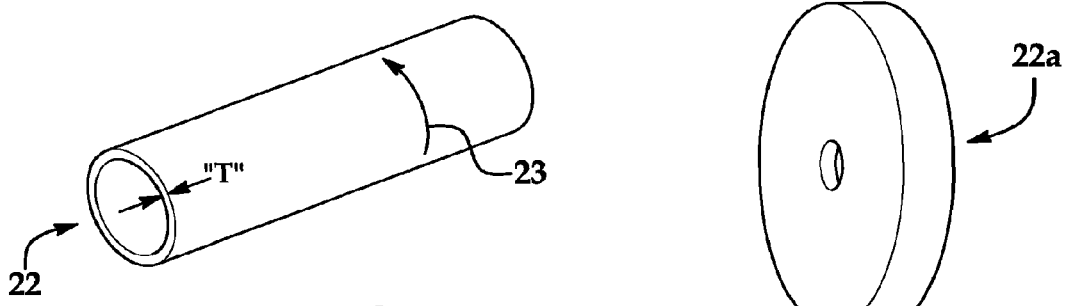
FIG. 2
FIG. 2A
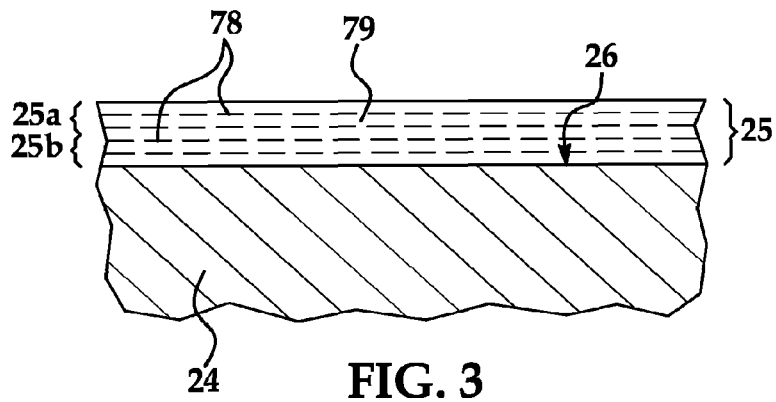
FIG. 3

METHOD AND APPARATUS FOR MAKING FIBER REINFORCED COMPOSITE TUBES

This application is a divisional of application Ser. No. 12/886,860, filed Sep. 21, 2010.

TECHNICAL FIELD

This disclosure generally relates to processes for making composite structures, and deals more particularly with a method and apparatus for making fiber reinforced composite tubular structures.

BACKGROUND

Tubular structures are used in a variety of applications such as, for example and without limitation, liquid and gas storage tanks, rocket motor casings, flywheel rotors and structural support members, to name only a few. In some applications, it may be desirable to fabricate these tubular structures using fiber reinforced composites in order to achieve lower manufacturing costs and/or higher strength per unit rate ratios.

In the past, composite tubular structures have been fabricated by winding tows of fibers over a rotating mandrel. The fibers may be pre-impregnated with a polymer resin, or the resin may be added to the fibers during mandrel winding. This prior process, while effective, may not be well suited for applications where both high strength and low manufacturing costs are desired. For example, in order to maintain the fiber volume fraction of the resulting composite relatively high, the fibers must be maintained in tension during the winding process, requiring long lengths of fiber which may increase the cost of fiber feed stock. Shorter fibers could be used to reduce the cost of the feed stock, however a high fiber volume fraction may be difficult to obtain using shorter fibers, in part because it is difficult to apply the necessary pressure to the fibers during the winding process, and the centrifugal force generated by the mandrel tends to throw short fibers outwardly away from the mandrel.

Other processes have been used to produce composite tubular structures, particularly for high volume production, including high speed extrusion, injection molding, and pultrusion. However, these manufacturing techniques may result in largely random orientations which may be undesirable for composite strength.

In addition to the need for a relatively high fiber volume and directional fiber orientation, higher performance levels of composite tubular structures may require that the reinforcing fibers in the final product have a sufficiently high aspect ratio, i.e. length-to-diameter ratio. The need for high fiber volumes, controlled fiber orientation and the use of fibers having high aspect ratios may make the use of conventional high speed production techniques impractical. For example, the requirements of high fiber volume and aspect ratios may result in fiber breakage during processing from fiber-polymer interaction, fiber-fiber interaction, and fiber contact with surfaces of processing equipment. In general, the fiber length decreases as the fiber volume fraction increases, making it difficult to obtain sufficiently long fibers to obtain the highest performance with low cost, high value production processes. Finally, as previously mentioned, known production processes tend to result in a relatively high degree of randomness in short fiber orientation, which may undesirably affect performance of the composite, compared to the performance that may be obtained using continuous fibers and controlled orientation provided by wrapping continuous fibers under tension around a spinning mandrel.

Accordingly, there is a need for a cost-effective method and apparatus for making fiber reinforced tubular structures that use short fibers having optimized aspect ratios in which high fiber fractions and fiber alignment are achieved to meet high performance requirements.

SUMMARY

The disclosed embodiments provide a method and apparatus for making fiber reinforced composite tubular structures, such as tubes and hollow cylinders, which may reduce costs and are well suited for high volume production. The method allows the use of short, rather than continuous, reinforcing fibers which may lower the cost of feedstock. Short reinforcing fibers may be used that have optimized aspect ratios, and relatively high fiber fraction levels may be achieved. The method uses a rotatable mandrel to produce tubular structures with aligned fibers that provide the structure with high circumferential, hoop strength. Additionally, other characteristics of the tubular structure, including surface finish, may be controlled by controlling the smoothness of the inner mold line of the mandrel, the rotational speed of the mandrel, the fiber volume and the amount and type of the resin. Rotation of the mandrel at relatively high speeds compacts the fibers and consolidates composite layers applied to the mandrel. The apparatus may include an adjustable fiber nozzle containing a plurality of nozzle tips to reorient the fibers from their initial orientation in preparation for ejection from the tip. The apparatus may include means for cutting the fibers to specified lengths, and means for ejecting the cut fibers in a specific orientation relative to the rotating mandrel. The apparatus may include a continuous fiber storage and feed.

According to one disclosed embodiment, a method is provided of making a composite tube comprising spinning a mandrel having an interior wall, and directing short reinforcing fibers and a resin onto the interior wall of the spinning mandrel. Directing the fibers and the resin may include supplying short discrete resin-impregnated fibers to a nozzle, and ejecting the supplied fibers through the nozzle onto the spinning interior mandrel wall. Supplying the fibers may include cutting the fibers from a substantially continuous length of prepreg fiber. In one embodiment, directing the fibers and the resin may include mixing the individual fibers with resin and ejecting the mixed fiber and resin through a nozzle onto the spinning interior mandrel wall. Directing the fibers and the resin may also include forming layers of the resin and fibers on the spinning interior mandrel wall. The method may further comprise melting the layers together and curing the melted layers to form a substantially solid resin matrix reinforced by the fibers. Forming the layers may include relatively moving the mandrel and the nozzle along the central axis of the mandrel. Melting the resin delivered onto the interior mandrel wall may be achieved by heating the mandrel.

According to another disclosed embodiment a method is provided of making a composite tube. The method comprises applying layers of a polymer resin combined with short reinforcing fibers on an interior wall of a spinning mandrel. The method further comprises fusing the layers into a substantially continuous, fiber reinforced resin matrix. Applying the layers may include directing a stream of prepreg fibers onto the interior mandrel wall, and fusing the layers may be achieved by melting the layers together.

According to a further embodiment, apparatus is provided for making a composite tube. The apparatus comprises a mandrel having an interior wall and a central axis. The apparatus also comprises means for spinning the mandrel about the central axis and means for applying individual short fibers and a resin on the interior mandrel wall as the mandrel is spinning. The apparatus further comprises means for heating the mandrel. The means for applying discrete fibers and a resin includes at least one nozzle for delivering at least one of the fibers in the resin onto the interior mandrel wall, and means for relatively moving the mandrel and the nozzle along the central axis.

According to still another embodiment, apparatus is provided for making a composite tube. The apparatus comprises a mandrel having an interior wall having a central axis, and a first drive for spinning the mandrel about the central axis. The apparatus further includes a system for applying layers of short reinforcing fibers and resin to the cylindrical wall of the spinning mandrel, including at least one nozzle for directing the fibers onto the interior mandrel wall. The apparatus further comprises a second drive for relatively moving the nozzle and the mandrel along the central axis. The apparatus may further comprise means for heating the mandrel to a temperature sufficient to melt the layers of resin. The nozzle may be oriented to direct the fibers onto the interior mandrel wall in a circumferential direction. The nozzle may include a nozzle body having a tip and a passageway through which fibers may pass. The nozzle may further include guides for guiding the fibers through the passageway and a drive for pulling the fibers through the passageway and expelling the fibers from the nozzle tip.

BRIEF DESCRIPTION OF THE ILLUSTRATIONS

FIG. 1 is an illustration of a functional block diagram of apparatus for making fiber reinforced, composite tubular structures.

FIG. 2 is an illustration of a perspective view of a tube made by the disclosed method and apparatus.

FIG. 2A is an illustration of a perspective view of a flywheel rotor made by the disclosed method and apparatus.

FIG. 3 is an illustration of a sectional view of a part of the mandrel, designated as FIG. 3 in FIG. 1.

DETAILED DESCRIPTION

Figure 4:
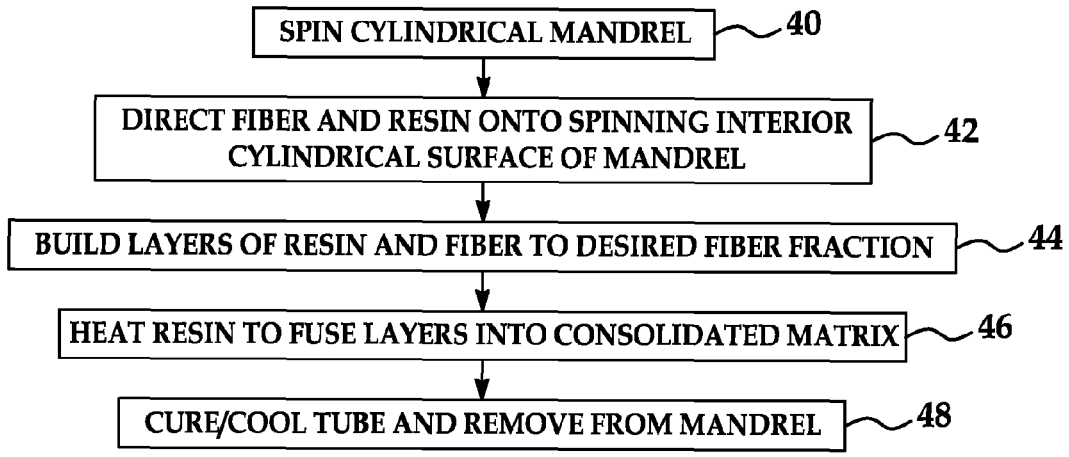
FIG. 4 is an illustration of a flow diagram of a method of making tubular structures using the apparatus shown in FIG. 1.

The disclosed embodiments relate to an apparatus 20 shown in FIG. 1 used to make fiber reinforced composite tubular structures. For example, and without limitation, the apparatus 20 may be used to make the relatively thin walled, cylindrical tube 22 having high hoop strength shown in FIG. 2, and the relatively thick walled, relatively large diameter circular flywheel ring 22a shown in FIG. 2A which may be used for energy storage. The apparatus 20 may also be used to make a variety of other tubular structures of various sizes, proportions and thicknesses, which for ease of description, will be collectively referred to hereinafter as a tube 22.

Referring now to FIGS. 1, 2 and 3, the apparatus 20 broadly includes a mandrel 24 spun about a central axis 84 by a rotary drive 28, and a fiber delivery system 30 which applies short reinforcing fibers 78 (FIG. 3) on an interior cylindrically shaped wall 26 of the mandrel 24. As used herein, "short" fibers refers to fibers 78 of individual, discrete lengths, in contrast to continuous fibers. The fibers 78 may be dry fibers or fibers that have been pre-impregnated with a suitable polymer resin 79 (pre-preg fibers), which may comprise, for example and without limitation, a thermoset or a thermoplastic, or a combination thereof. A displacement drive 32 produces relative linear movement between the mandrel 24 and the fiber delivery system 30 along the central axis 84 so that the short fibers 78 are applied to the interior mandrel wall 26 in layers e.g. 25a, 25b. These layers 25a, 25b are successively melted and/or cured to form a composite 25 (FIG. 3) comprising a fiber reinforced, consolidated matrix of resin 79 in which the fibers 78 that are substantially aligned in the circumferential direction 23 (FIG. 2) of the tube 22.

In an alternate embodiment, an optional resin delivery system 38 is provided for applying resin 79 to dry fibers 78 from the fiber delivery system 30, or to the interior mandrel wall 26 where the resin 79 wets and mixes with the dry fibers 78 as they are applied to the interior mandrel wall 26 by the fiber delivery system 30. The layers 25a, 25b of resin 79 mixed with fibers 78 applied to the interior mandrel wall 26 and is heated to the melt and/or cure temperature of the resin 79 by means of a heating system 34 which is used to heat the mandrel 24. A controller 38, which may comprise a PC (personal computer) or PLC (programmable logic controller) controls and synchronizes the operation of the rotary drive 28, the displacement drive 32, heating system 34 and the delivery systems 30, 38.

The tube 22 is built up on the spinning inner mandrel wall 26 by spraying or depositing matrix resin 79 and short fibers 78 onto the interior mandrel wall 26. The fibers 78 are applied to the inner interior mandrel 26 such that the rotational velocity of the rotating mandrel 24 and radial and axial velocity of the fibers 78 are designed to align the fibers 78 to the desired circumferential orientation. Substantial circumferential orientation of the fibers 78 increases the hoop strength of the tube 22. The contact of the fibers 78 with the rotating mandrel 24 aligns and consolidates the fibers 78 and the resin 79, and may assist in distributing the resin 79 and/or impregnating the fiber 78 with the rein 79. The relative density of the fibers 78 and the resin 79 combined with the relative viscosity of the fiber-resin mixture may be used to vary the fiber volume fraction and compaction as the temperature of the mandrel 24 can be controlled along with its rotational velocity. Various methods of applying the fibers 78 can be used by projecting the fibers 78 through a tube or other orifice (not shown in FIG. 1) such that the fibers 78 are impaled onto the rotating interior mandrel wall 26 where they are essentially free floating within melted resin 79 and self-orient in the circumferential direction 23 (FIG. 2) as a result of the rotation of the mandrel 24. The fibers 78 may be applied as individual lengths of fibers 78 or as groups of fibers 78 derived from cutting short lengths of fiber tows (not shown).

FIG. 4 broadly illustrates the overall steps of a method of making a fiber reinforced composite tube 22 using the apparatus shown in FIG. 1. Beginning at 40, the mandrel 24 is spun about its central axis 84 by the rotary drive 28. At step 42, composite material 25 comprising individual reinforcing fibers 78 and resin 79, is applied to the spinning interior mandrel wall 26. At 44, layers 25a, 25b (FIG. 3) of the composite material 25 are successively built-up on the interior mandrel wall 26 until the desired tube wall thickness "T" (FIG. 2) is achieved. At step 46, as the composite material layers 25a, 25b are being formed on the interior mandrel wall 26, they are heated to a pre-selected temperature by heated mandrel 26, causing the resin 79 to melt and fuse into a continuous matrix reinforced by the short fibers 78. Where resin 79 is applied in liquid form by the resin delivery system 38 (FIG. 1), heating of the mandrel 24 may reduce the viscosity of the liquid resin 79, which may result in improved flow and distribution of the resin 79. Depending upon the particular polymer resin 79 used, the formed composite tube 22 is cured and/or cooled at step 48 and removed from the mandrel 24.

Figure 5:
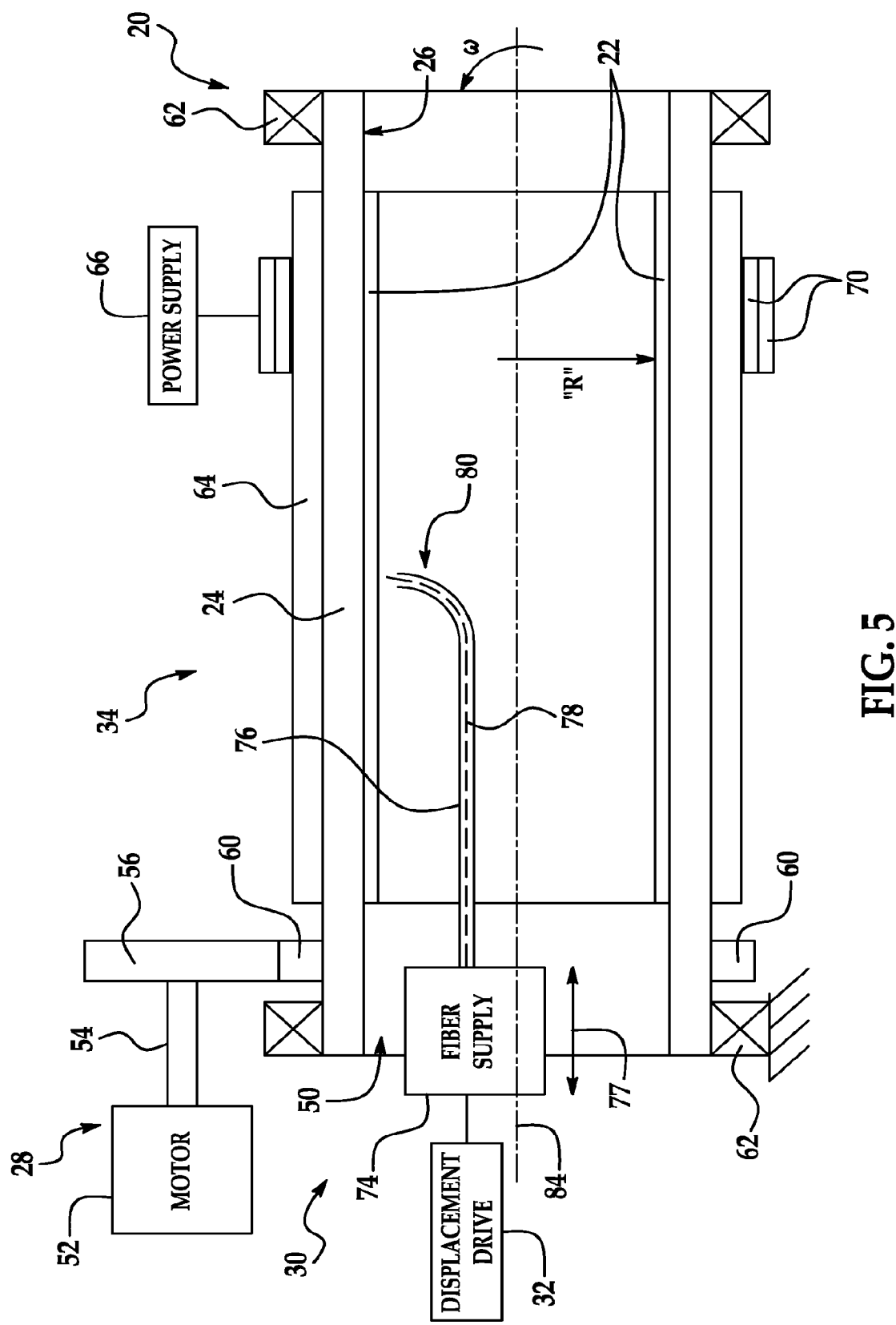
FIG. 5 is an illustration of a combined cross sectional and block diagram of the apparatus shown in FIG. 1.

Attention is now directed to FIG. 5 which illustrates additional details of the apparatus 20. The mandrel 24 is generally cylindrical in shape and includes a substantially cylindrical interior mandrel wall 26 on which the tube 22 may be formed. The mandrel 24 may be fabricated from a suitable rigid material, such as metal, by conventional processes such as, without limitation, machining or molding. In other embodiments, the mandrel 24 may be formed of other material including composites that possess relatively high thermal conductivity. In one example, the mandrel 24 is made of a metal having relatively high thermal conductivity, a high coefficient of thermal expansion and high strain capability relative to the tube 22 so that the mandrel 24 may be heated quickly to release the tube 22 after the final consolidation of the tube 22. At least one end 50 of the mandrel 24 may be open during all or a portion of the process.

While the interior mandrel wall 26 in the illustrated embodiment is substantially cylindrical, other shapes are possible for producing tubular structures other than cylindrical tubes 22. For example, the interior wall of the mandrel 24 may be spherically shaped, and the cross section of the mandrel wall 26 may have any of various shapes, such as without limitation, a square with radiused corners (not shown) or an ovoid (not shown). Furthermore, the cross sectional shape of the interior mandrel wall 26 may not be constant along its length. For example, the mandrel wall 26 may be stepped along its length. Furthermore, the cross section of the mandrel wall may transition between differing shapes along its length, such as without limitation, transitioning from a spherical shape to a cylindrical shape.

The mandrel 24 is mounted on suitable bearings 62 for rotation about the central axis 84 of the cylindrical interior mandrel wall 26 at a pre-selected angular velocity "ω". The rotary drive 28 may comprise a suitable motor 52 which rotates a drive gear 56 through an output shaft 54. The drive gear 56 in turn drives a ring gear 60 surrounding and affixed to the mandrel 24. A variety of other rotary drive arrangements are possible, including belt drives. Alternatively, the mandrel 24 may be mounted in a chuck (not shown) of a lathe (not shown) which may be used to spin the mandrel 24 about the central axis 84.

The mandrel 24 is heated by the heating system 34 which, in the illustrated embodiment, comprises electrical resistance heating coils 64 surrounding and affixed to the exterior surface of the mandrel 24. The heating coils 64 are powered by electrical power supply 66 that delivers electrical current to the heating coils 64 through slip rings 70. In other embodiments, mandrel heating may be achieved by allowing the mandrel 24 to rotate in a stationary fluid bath (not shown) wherein the fluid is heated by any suitable external means. Mandrel heating may also be achieved using stationary radiant heating elements (not shown) that are positioned in close proximity to the mandrel 24, or by any of a variety of other suitable heating devices and techniques.

The fiber delivery system 30 comprises a supply of short, individual fibers 78 which are delivered under pressure, such as air pressure, through a delivery line 76 to a nozzle 80. Other suitable fiber delivery systems are possible, including those that may deliver the fibers 78 in the form of tows (not shown). The fiber delivery system 30 may include a supply (not shown) of continuous fibers (or tows) that are cut into the desired individual fiber lengths by a suitable cutting mechanism (not shown). Depending on the design of the nozzle 80, the individual short fibers 78 may be delivered end-to-end in a single stream or in multiple groups or streams (not shown) of fibers 78. The nozzle 80 is oriented generally perpendicular to the central axis 84 and is inclined relative to the interior mandrel wall 26 for reasons that will be discussed below in more detail. As the short fibers 78 are streamed onto the spinning interior mandrel wall 26, the displacement drive 32 displaces the fiber supply 74, delivery tube 76 and nozzle 80 linearly along the central axis 84. The fiber delivery system 30 is displaced back and forth 77 across the length of the cylindrical interior mandrel wall 26 so as to build up successive layers (see FIG. 3) of resin 79 and short fibers 78.

Figure 6:
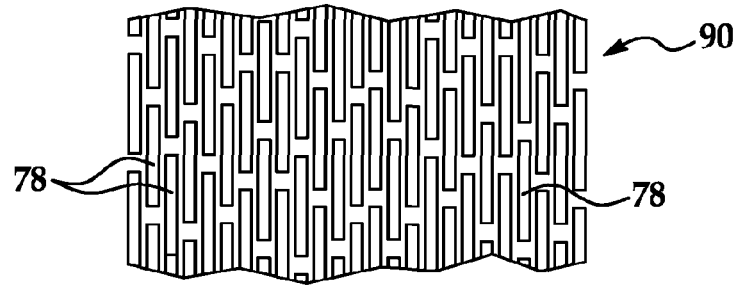
FIG. 6 is an illustration of a portion of a composite layer applied to the interior mandrel wall shown in FIG. 5.

In other embodiments, the fiber delivery system 30 may remain stationary while the mandrel 24 is linearly displaced back and forth along the central axis 84. In still another embodiment, the mandrel 24 as well as the fiber supply 74 may remain stationary while the displacement drive 32 displaces only the nozzle 80 and the supply line 76 linearly back and forth over the interior mandrel wall 26. As a result of the orientation of the delivery nozzle 80 and the centrifugal force generated by the spinning mandrel 24, the short fibers 78 self-align with each other as shown at 90 in FIG. 6, in the circumferential direction 23 (FIG. 2) of the interior mandrel wall 26. While the central axis 84 is shown as being substantially horizontal in the illustrated embodiment, in other embodiments, the axis 84 of the mandrel 24 may be oriented vertically, or at other angles.

In one embodiment, the short fibers 76 may be cut from a continuous fiber or tows (not shown) using a cutting mechanism (not shown) forming part of the fiber supply 74.

The short fibers 78 may be pre-impregnated with the resin 79, while in other embodiments, the fibers 78 may be dry or tackified. The fibers 78 may comprise any of a variety of materials that are commonly used to reinforce composites, including but not limited to glass, aramids and carbon. The fibers 78 may vary in length, depending upon the application, with an aspect ratio selected to provide maximum strength for the application. For example, in one embodiment, the fibers 78 may have a length of less than about 3 mm, while in other embodiments the fiber may have a length greater than 3 mm, and in fact the fibers 78 may have a length exceeding approximately 12 mm, which are sometimes referred to in the art as "long" fibers. The length of the fibers 78 may be selected based on the application, and may depend, at least in part, on the radius of curvature "R" of the cylindrical interior mandrel wall 26.

Figure 7:
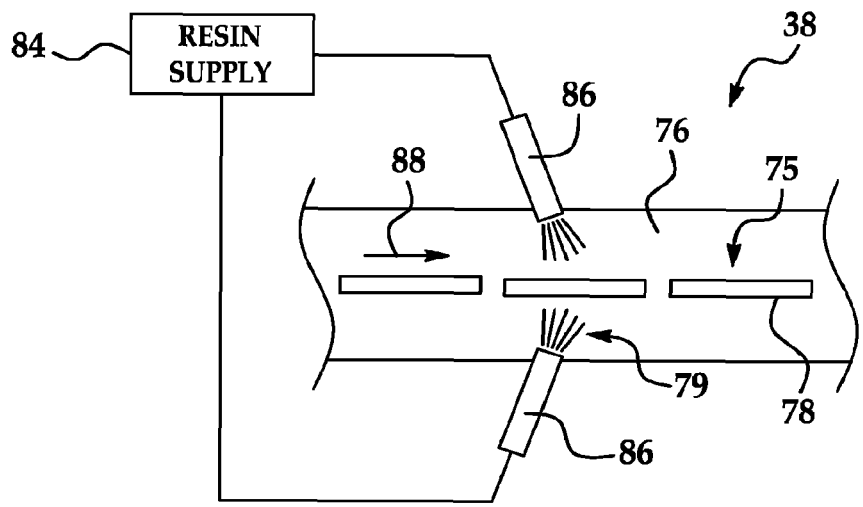
FIG. 7 is an illustration of a combined block and sectional view of a fiber delivery line in which dry fibers are being coated with resin.

As previously mentioned, the fiber supply 74 may supply fibers 78 that are either dry, tackified or are pre-impregnated with resin 79. Where the supplied fibers 78 are dry, a resin delivery system 38 (FIG. 1) may be used to impregnate, coat or "wet" the fibers 78 with the resin 79. FIG. 7 illustrates one embodiment of a suitable resin delivery system 38. In this example, a stream 75 of individual dry fibers 78 passing through the delivery line 76 in the direction of the arrow 88 are wetted with resin from a resin supply 84 that is sprayed or otherwise applied to the fibers 78 using applicator nozzles 86.

Figure 8:
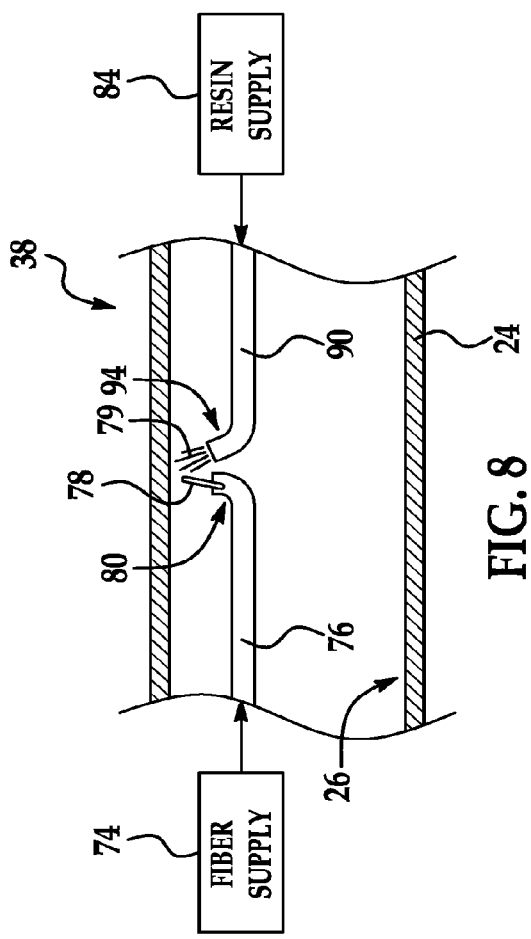
FIG. 8 is an illustration of a sectional view of a portion of the mandrel shown in FIG. 5 in which fibers and resin are separately applied to the interior mandrel wall.

FIG. 8 illustrates another embodiment of the resin delivery system 38 in which resin from a resin supply 84 is delivered through a resin supply line 90 to a nozzle 94 which sprays the resin 79 onto the interior mandrel 26 in the area where dry fibers 78 stream from the nozzle 80 onto the interior mandrel wall 26. In a variation of this embodiment, the resin nozzle 94 may be oriented to spray coat the dry fibers 78 with resin 79 as the fibers 78 exit the nozzle 80. The resin nozzle 94 as well as the resin supply line 90 may be coupled with the displacement drive (FIG. 5) so that the fiber application nozzle 80 and the resin nozzle 94 are displaced together and remain fixed relative to each other.

Figure 9:
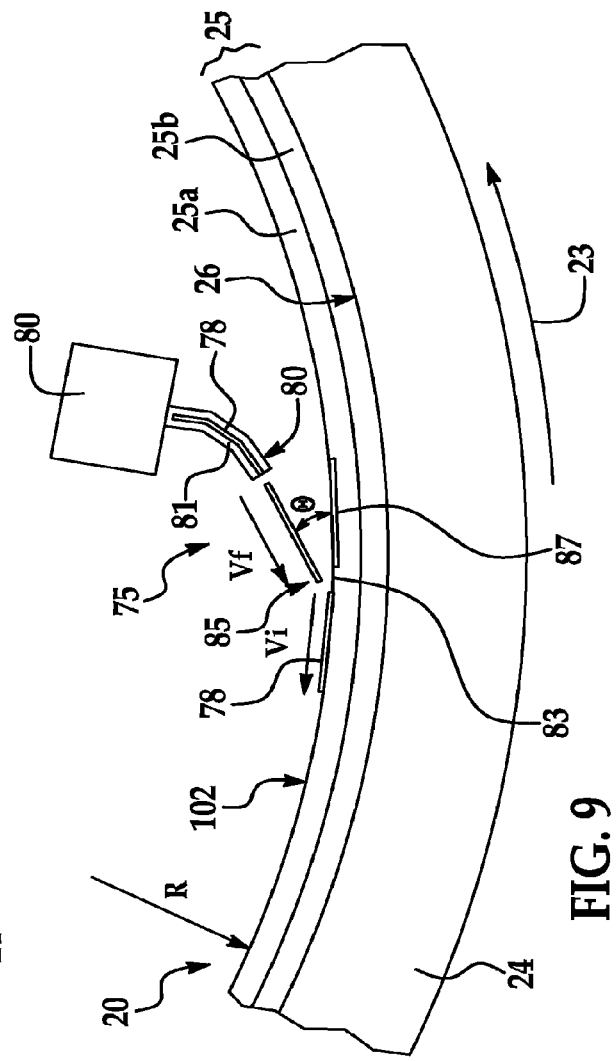
FIG. 9 is an illustration of a sectional view of a portion of the mandrel, showing a stream of fibers being applied over already-formed layers of composite material.

FIG. 9 better illustrates how the individual short fibers 78 are applied to the interior mandrel wall 26. As previously indicated, the mixture of fibers 78 and resin 79 is applied to the interior mandrel wall 26 to form a composite 25, only two of such layers 25a, 25b being illustrated in FIG. 9. As a result of the heating mandrel 24, layer 25b is cured, thereby fixing the position of the fibers 78 within layer 25b. Layer 25a, however which has been freshly applied, is not yet cured, consequently the fibers 78 in layer 25a may be free to change their orientations within the surrounding resin 79 of the layer 25a as the mandrel 24 is rotating. As previously mentioned, rotation of the mandrel 24 urges the fibers 78 to self-align in the circumferential direction 23. Rotation and heating of the mandrel 24 is continued as the resin 79 is curing until all of the layers 25a, 25b etc. are at least partially cured or substantially fully cured. Fibers 78 dispensed from one or more fiber supply nozzles pass through an arcuate nozzle tip 81 and exit the nozzle tip 81 at an angle θ to the tangent 87 of the surface 102 of the uncured layer 25a at the point of impact 83 of the fibers 78 on the surface 102. The inner surface 102 of the uncured layer 25a moves at a velocity $V_i$ relative to the stationary nozzle 80. Fibers 78 moves at a velocity $V_f$Cos θ in the same direction as $V_i$ and with a velocity $V_f$ Sin θ in the radial direction. When the fiber 78 impacts the inner surface 102 of the layer 25a, the leading edge 85 of the fiber 78 sticks at the point of impact 83, and the rotating assembly of the mandrel 24 and the layer 25a drag this impacted point 83 of the fiber 78 circumferentially 23. The radial velocity of the fiber 78 in combination with the force produced by rotation of the mandrel 24 rotates the fiber to lie substantially flat on the inner surface 102 of the layer 25a.

As previously mentioned, while only single stream of fibers 78 are shown being serially ejected from the nozzle 80, multiple streams (not shown) of individual fibers 78 may be delivered from the nozzle tips 81 on multiple nozzles 80 in other embodiments. In one practical embodiment, where $V_i=V_f$Cos θ, the nozzle tip 81 moves axially at the rate of one fiber (or tow) thickness per revolution of the mandrel 24. In other embodiments, a preferred operating relationship is represented by $V_i=N V_f$Cos θ, where N is an integer, and the axial movement rate is one fiber diameter per N revolutions of the mandrel 24.

In the uncured composite layer 25a, a fiber 78 at some radius $R_f$ in the layer 25a will experience a radial force equivalent to the weight of all of the fibers 78 and the resin 79 above it, multiplied times the centrifugal force $F_c=mV_i^2/R_f$ g, where g is the acceleration of gravity and $R_f$ is the radius of the average depth of the uncured layer 25a. The force $F_c$ will push the fiber 78 against the relatively unmoving cured layer 25b, thereby compacting the fibers 78 and resulting in a relatively high fiber fraction. This process will act to form the fibers in the uncured layer 25a into a high volume fraction geometry.

In the example shown in FIG. 9, nozzle tip 81 is oriented substantially perpendicular to the central axis 84 (FIG. 5) of the mandrel 24, resulting in a laydown of fibers 78 in the hoop or circumferential direction 23 of the tube 22. In some embodiments, it may be desirable to have some fraction of the fibers 78 with some partial orientation along the central axis 84. This axial orientation of a fraction of the fibers 78 may be achieved by either of at least two techniques. In one technique, the nozzle tip 81 may be oriented at some angle (not shown) along the central axis 84 so that the velocity of the fibers 78 leaving the nozzle tip 81 has a longitudinal component (not shown) generally parallel to the central axis shown in FIG. 5. Using a second technique, the orientation of the nozzle tip 81 may remain fixed, but it may be provided with a component of axial velocity, causing it to move up and down the central axis 84 of the mandrel 24, giving the exiting fiber 78 a component of axial velocity. It should be noted here that while only a single nozzle 80 has been shown, multiple nozzles 80 may be used to increase the laydown rate and productivity.

Figure 10:
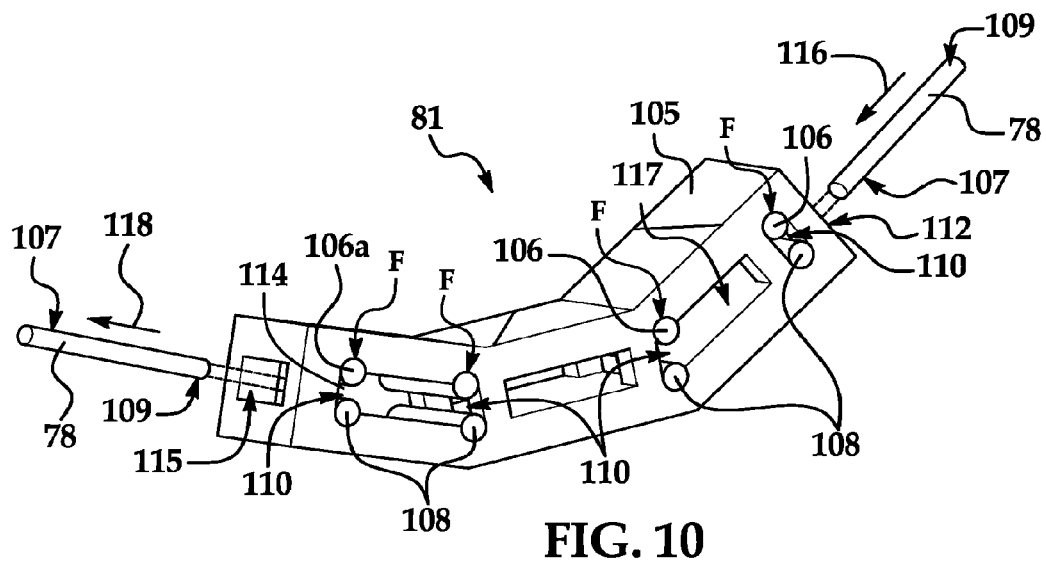
FIG. 10 is an illustration of a perspective view of a nozzle tip forming part of the fiber delivery system shown in FIGS. 1 and 5.

Attention is now directed to FIG. 10 which illustrates the details of one form of the nozzle tip 81, but wherein sidewalls, springs and drive mechanisms having been omitted for clarity. The nozzle tip 81 comprises a body 105 having a fiber entrance 112 and a fiber exit 115 connected by a generally arcuate, internal passageway 117. The nozzle tip 81 further includes four sets of opposing rollers 106, 108 which guide the fibers 78 as they pass through the nozzle tip 81. A gap 110 between each set of rollers 106, 108 is slightly less than the diameter of a fiber 78 forming a nip 114. One of the rollers 106, 108 in each set thereof may be spring loaded to apply a force F to the fibers 78 in order to effectively grip the fibers 78 as they pass through the nozzle tip 80 and maintain the fibers substantially straight relative to the centerline (not shown) of the nozzle tip 80. One of the rollers 106a near the fiber exit 115 may be driven by a motor (not shown) or the like which, in combination with the spring force F, grabs the leading edge 107 of each fiber 78 and pulls it through the nozzle tip 81 until the trailing edge 109 of the fiber 78 moves through the fiber exit 115. In other embodiments, additional ones of the rollers 106, 108 may also be driven by motors (not shown).

In operation, a fiber 78 enters the nozzle tip 81 through the fiber entrance 112 and is pushed through the nozzle tip 81 by force applied to the fibers 78 by the fiber supply (FIG. 5) 74 until the leading edge 107 of the fiber 78 engages roller 106*a* which grabs the fiber 78. In embodiments where the fiber feed is a continuous fiber that is cut into short lengths by the previously mentioned cutting mechanism (not shown), the fiber 78 may be severed by the cutting mechanism within in the nozzle 80 shown in FIG. 9, separating it from the remainder of the fiber feed and allowing it to be pulled by the roller 106*a* until it is ejected from the fiber exit 115. The roller 106A rotates at an angular rate that is sufficient to give the fibers 78 leaving the fiber exit 115 a velocity that will carry them to the mandrel wall 26. Upon leaving the fiber exit 115, the fibers 78 may be sprayed with resin 79 as they move toward the interior mandrel wall 26.

In one embodiment, the roller 106*a* may be driven continuously to continuously drive the individual fibers 78 end-to-end in a nearly constant fiber stream from the fiber exit 115. The controller 36 (FIG. 1) may be used to synchronize the fiber feed from the nozzle 80, which may be required to stop the fiber feed momentarily while the fiber 78 is being cut.

Figure 11:
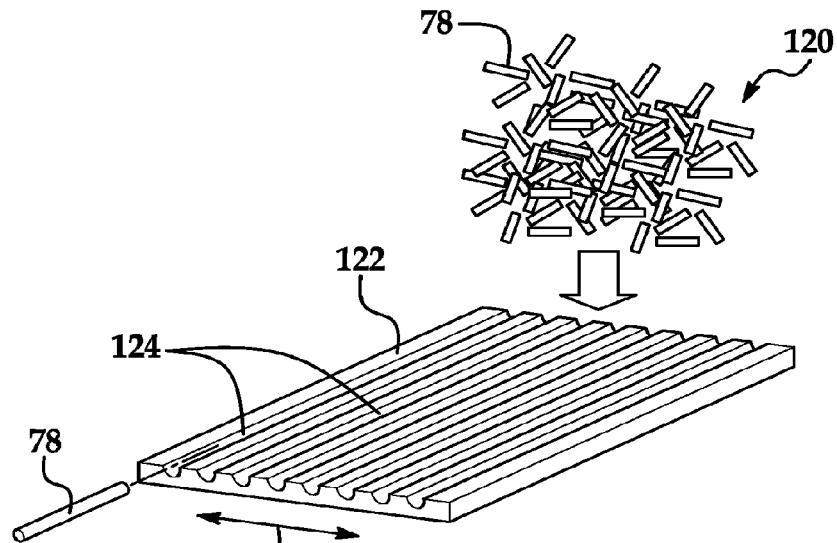
FIG. 11 is an illustration of a perspective view of a grooved plate used to align a group of randomly oriented short reinforcing fibers into an ordered array.
Figure 12:
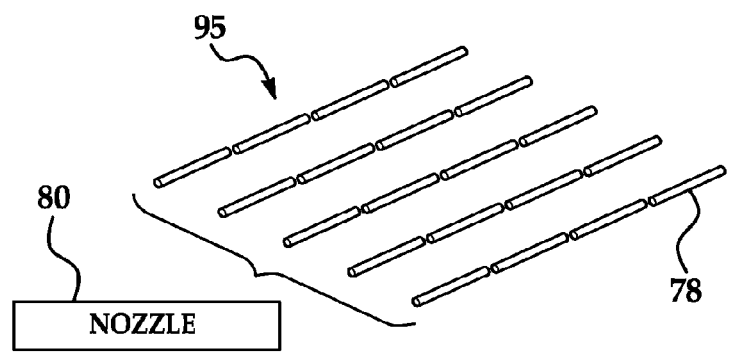
FIG. 12 is an illustration of a perspective view of an array of fibers arranged to be fed to a fiber dispensing nozzle.

FIG. 11 illustrates another technique for feeding individual fibers 78 through the nozzle 80 and nozzle tip 81. In this example, pre-cut, individual and randomly oriented fibers 78 may be placed on an alignment device, such as a plate 122 having grooves 124. In the illustrated example, the grooves 124 are generally parallel. However, in other embodiments, the groves 124 may taper to a feed point (not shown) where they are directed into the nozzle tip 81. The plate 122 may be vibrated as shown at 126 so that fibers 78 placed on the plate 122 are sorted and urged into the grooves 124, thereby aligning the fibers 78 end-to-end in an array 95 as shown in FIG. 12. The aligned fibers 78 may then be funneled into a serial stream (not shown) that is fed through the nozzle 80. Other techniques for arranging randomly oriented fibers 78 into an ordered array 95 prior to being fed to the nozzle 80 may be possible.

Figure 13:
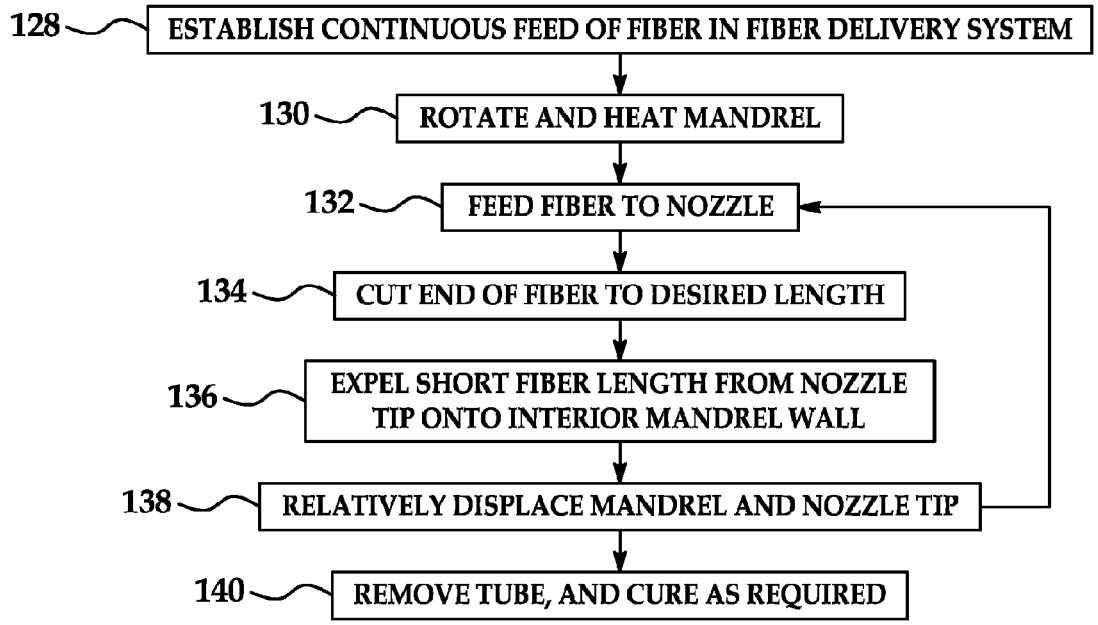
FIG. 13 is an illustration of a flow diagram showing additional details of one method of making tubular structures using the apparatus shown in FIGS. 1 and 5.

Attention is now directed to FIG. 13 which illustrates additional details of a method of making a fiber reinforced composite tube 22 using the apparatus 20 of FIG. 1. Beginning at 128, a continuous feed of fiber 78 is established in the fiber delivery system 30. At 130, the mandrel 24 is rotated and heated. At 132, an end of the fiber 78 is fed to the nozzle 80. At 134, the fiber 78 is cut to the desired length and at 136, the short length of chopped fiber 78 is expelled from the end of the nozzle tip 81 onto the interior mandrel wall 26. At 138, the nozzle tip 81 and the mandrel 24 are relatively displaced axially at the appropriate speed so as to form successive layers of composite 25 on the interior mandrel wall 26. In some cases where the resin 79 used is a thermoset, the heated mandrel 24 may fully cure the tube 22, which may eliminate or at least reduce the need for post curing in an oven or autoclave (not shown). However, in other cases the tube 22 may be only partially cured by the heating provided by the mandrel 24, thus requiring additional curing in an oven or autoclave, shown at 140. Depending on the rotational speed of the mandrel 24, the centrifugal force of generated by the rotating mandrel 24 may be sufficient to consolidate and compact the composite 25 to a degree that makes it unnecessary to use vacuum forces to compact and consolidate the composite 25.

Figure 14:
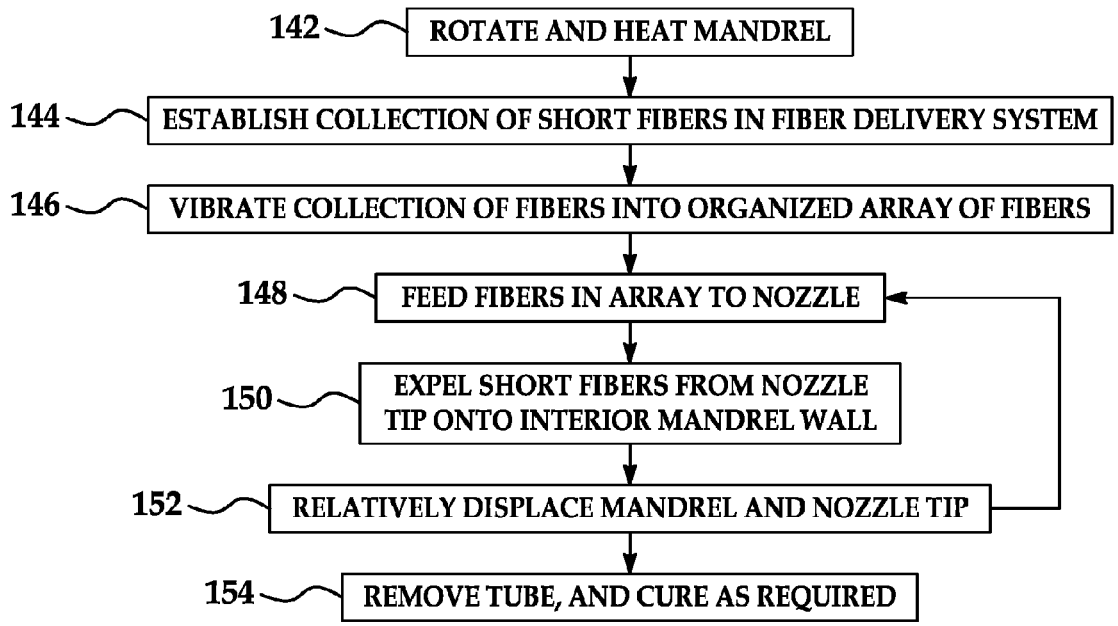
FIG. 14 is an illustration of a flow diagram showing additional details of another method of making tubular structures using the apparatus shown in FIGS. 1 and 5.

FIG. 14 illustrates details of an alternate embodiment of the method for making fiber reinforced tubes 22. Beginning at 142, the mandrel 24 is rotated and heated. At 144, a collection 120 of short fibers 78 is established in the fiber delivery system 30. At 146, the fibers 78 are vibrated into an organized array 95 of fibers 78. At 146, the ends of fibers 78 in the array 95 are fed to the nozzle 80. At 150, the short fibers 78 are expelled from the end of the nozzle tip 81 onto the spinning interior mandrel 26. At 152, the nozzle tip 81 and the mandrel 24 are relatively displaced to form layers 25*a*, 25*b* of composite 25 on the interior mandrel wall 26. At 154, the composite tube 22 may be post cured, as required.

Figure 15:
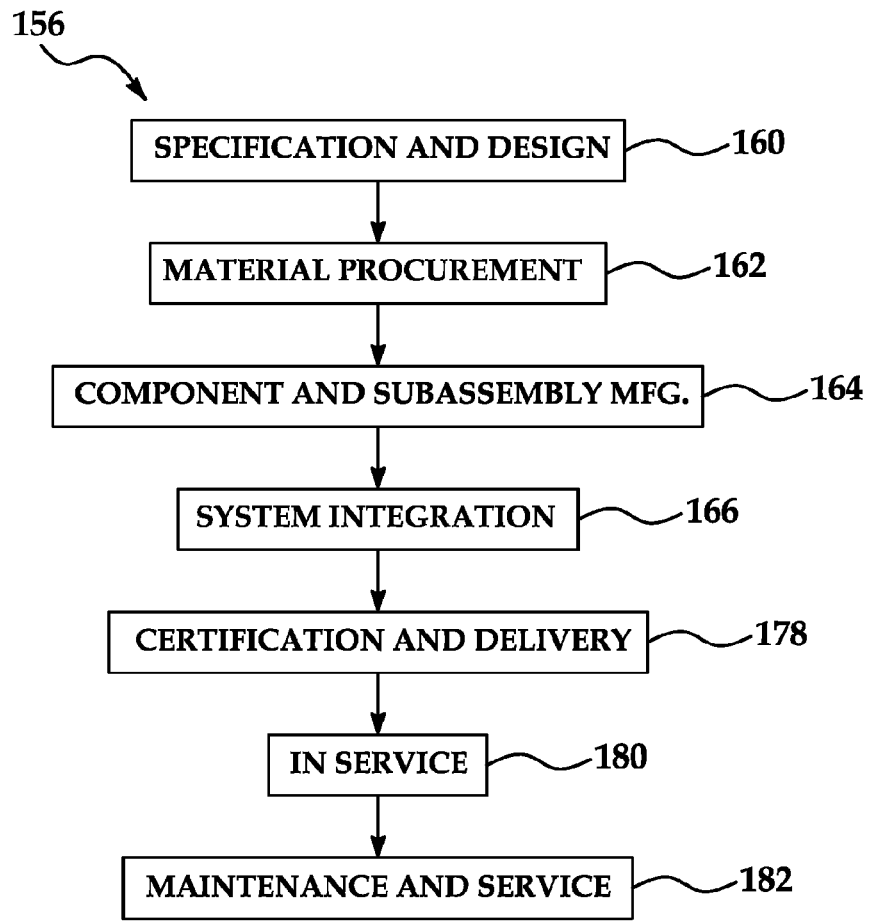
FIG. 15 is a flow diagram of aircraft production and service methodology.
Figure 16:
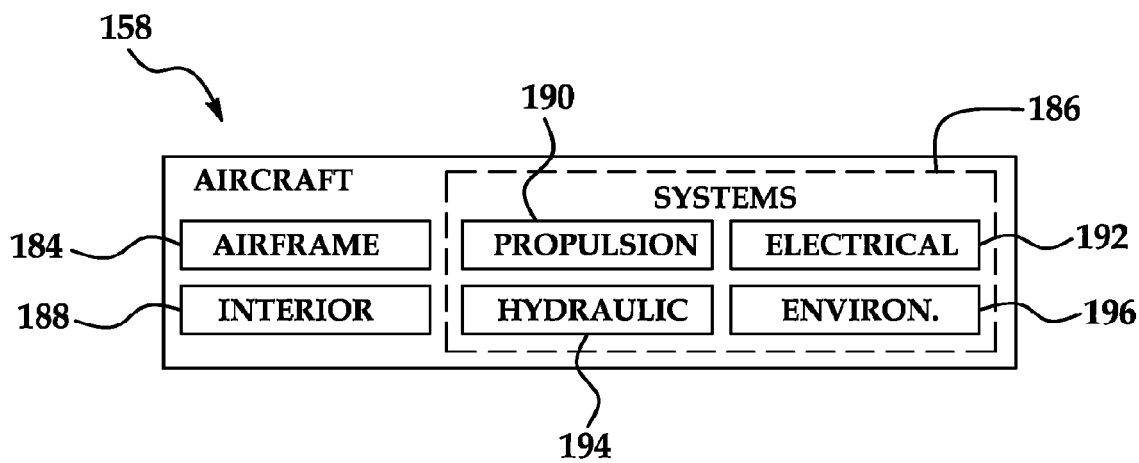
FIG. 16 is a block diagram of an aircraft.

Referring next to FIGS. 15 and 16, embodiments of the disclosure may be used in the context of an aircraft manufacturing and service method 156 as shown in FIG. 15 and an aircraft 158 as shown in FIG. 16. During pre-production, exemplary method 156 may include specification and design 160 of the aircraft 158 and material procurement 162. During production, component and subassembly manufacturing 164 and system integration 166 of the aircraft 158 takes place in which the disclosed method and apparatus may be used to make tubular structures used in components and subassemblies of the aircraft 158. Thereafter, the aircraft 158 may go through certification and delivery 178 in order to be placed in service 180. While in service by a customer, the aircraft 158 may be scheduled for routine maintenance and service 182 (which may also include modification, reconfiguration, refurbishment, and so on).

Each of the processes of method 156 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 16, the aircraft 158 produced by exemplary method 156 may include an airframe 184 with a plurality of systems 186 and an interior 188. Examples of high-level systems 186 include one or more of a propulsion system 190, an electrical system 192, a hydraulic system 194, and an environmental system 196. Any number of other systems may be included. The disclosed method and apparatus may be used to make tubular structures used in the airframe 184 and in the interior 188 of the aircraft 158. Although an aerospace example is shown, the principles of the invention may be applied to other industries, such as the automotive industry.

The apparatus embodied herein may be employed during any one or more of the stages of the production and service method 156. For example, components or subassemblies corresponding to production process 164 may be fabricated or manufactured in a manner similar to components or subassemblies produced while the aircraft 158 is in service. Also, one or more apparatus embodiments may be utilized during the production stages 164 and 166, for example, by substantially expediting assembly of or reducing the cost of an aircraft 158. Similarly, one or more apparatus embodiments may be utilized while the aircraft 158 is in service, for example and without limitation, to maintenance and service 182.

Although the embodiments of this disclosure have been described with respect to certain exemplary embodiments, it is to be understood that the specific embodiments are for purposes of illustration and not limitation, as other variations will occur to those of skill in the art.

What is claimed:

1. A machine configured to make a composite tube, such that the machine comprises:
   a mandrel that comprises an interior wall and a central axis; and
   a nozzle that comprises a set of rollers configured to grip a leading edge of a fiber and pull the fiber through the nozzle via the set of rollers being spaced apart from each other, by a distance less than a diameter of the fiber, and a spring configured to apply a force on at least one roller of the set of rollers, such that the nozzle applies individual fibers, while a resin coats the interior wall of the mandrel as the mandrel spins.

2. The machine of claim 1, further comprising:
   means for heating the mandrel.

3. The machine of claim 1, further comprising:
   a second nozzle configured to deliver the resin onto the interior wall of the mandrel, and means for relatively moving the mandrel and the nozzle along the central axis.

4. The machine of claim 1,
   further comprising a fiber delivery system, that comprises a source of individual fibers and means for delivering the individual fibers to the nozzle.

5. The machine of claim 1, further comprising the nozzle, such that the nozzle comprises a tip oriented at an angle relative to the central axis such that the fibers exit the tip comprising a velocity component, of the fibers, parallel to the central axis.

6. The machine of claim 1, further comprising a nozzle tip oriented at an angle relative to a tangent of an inner surface of the mandrel such that each fiber of the individual fibers exits the nozzle tip at a velocity equal to a tangential velocity of the inner surface of the mandrel divided by a product of a cosine of the angle and a quotient of a diameter of the fibers divided by a rate of movement of the nozzle relative to a central axis of the mandrel.

7. The machine of claim 1, further comprising the nozzle configured to move parallel to the central axis such that the fibers exit a tip of the nozzle comprising a velocity component, of the fibers, parallel to the central axis.

8. A machine for making a composite tube, comprising:
   a mandrel that comprises an interior wall that comprises a central axis;
   a first drive for spinning the mandrel about the central axis;
   a system configured to apply layers of fibers and layers of resin to the interior wall of the mandrel as it spins, such that the system comprises, for directing the fibers onto the interior wall, a nozzle that comprises a set of rollers configured to grip a leading edge of a short reinforcing fiber and pull the short reinforcing fiber through the nozzle via the set of rollers being spaced apart from each other, by a distance less than a diameter of the short reinforcing fiber, and a spring configured to apply a force on at least one roller of the set of rollers, such that, in operation, the set of rollers grips the leading edge of the short reinforcing fiber and pulls the short reinforcing fiber through the nozzle via the set of rollers being spaced apart from each other, by the distance less than the diameter of the short reinforcing fiber, and the spring applying the force on the at least one roller of the set of rollers; and
   a second drive for relatively moving the nozzle and the mandrel along the central axis.

9. The machine of claim 8, further comprising means for heating the mandrel to a temperature sufficient to melt the layers of resin.

10. The machine of claim 8, wherein the nozzle is oriented to direct the fibers onto the interior wall in a circumferential direction.

11. The machine of claim 8, wherein the nozzle includes:
    a nozzle body having a tip and a passageway through which fibers may pass,
    guides for guiding the fibers through the passageway, and
    a drive for pulling the fibers through the passageway and expelling the fibers from the tip.

12. A machine, for making a fiber reinforced composite tube, that comprises:
    a mandrel that comprises a cylindrical interior wall that comprises a central axis;
    bearings for mounting the mandrel for rotation about the central axis;
    a rotary drive for rotating the mandrel;
    a heating system for heating the mandrel as the mandrel is rotated;
    a fiber delivery system that comprises a supply of short reinforcing fibers and a nozzle, for directing the short fibers onto the cylindrical interior wall, that comprises a set of rollers configured to grip a leading edge of a short reinforcing fiber and pull the short reinforcing fiber through the nozzle via the set of rollers being spaced apart from each other, by a distance less than a diameter of the short reinforcing fiber, and a spring configured to apply a force on at least one roller of the set of rollers;
    a resin delivery system including a supply of resin and a nozzle for wetting the short reinforcing fibers with resin;
    a displacement drive for relatively displacing the mandrel and the nozzles; and
    a control system for controlling operation of: the rotary drive the heating system, the fiber delivery system, the resin delivery system, and the displacement drive.

* * * * *

UNITED STATES PATENT AND TRADEMARK OFFICE
CERTIFICATE OF CORRECTION

PATENT NO. : 9,511,513 B2  
APPLICATION NO. : 14/604682  
DATED : December 6, 2016  
INVENTOR(S) : Hull et al.

Page 1 of 1

It is certified that error appears in the above-identified patent and that said Letters Patent is hereby corrected as shown below:

In the Claims

Column 11, Line 5, change "axis;" to -- axis; and --
    Line 6, change "and" to -- -- (DELETE LINE)
    Line 22-23, change "claim 1," to -- claim 1, further comprising a fiber delivery --
    (CONTINUE WITH NO LINE BREAK)

Column 12, Line 51, change "drive the heating" to -- drive, the heating --

Signed and Sealed this  
Fifth Day of December, 2017

Joseph Matal  
*Performing the Functions and Duties of the*  
*Under Secretary of Commerce for Intellectual Property and*  
*Director of the United States Patent and Trademark Office*